Figure 1:
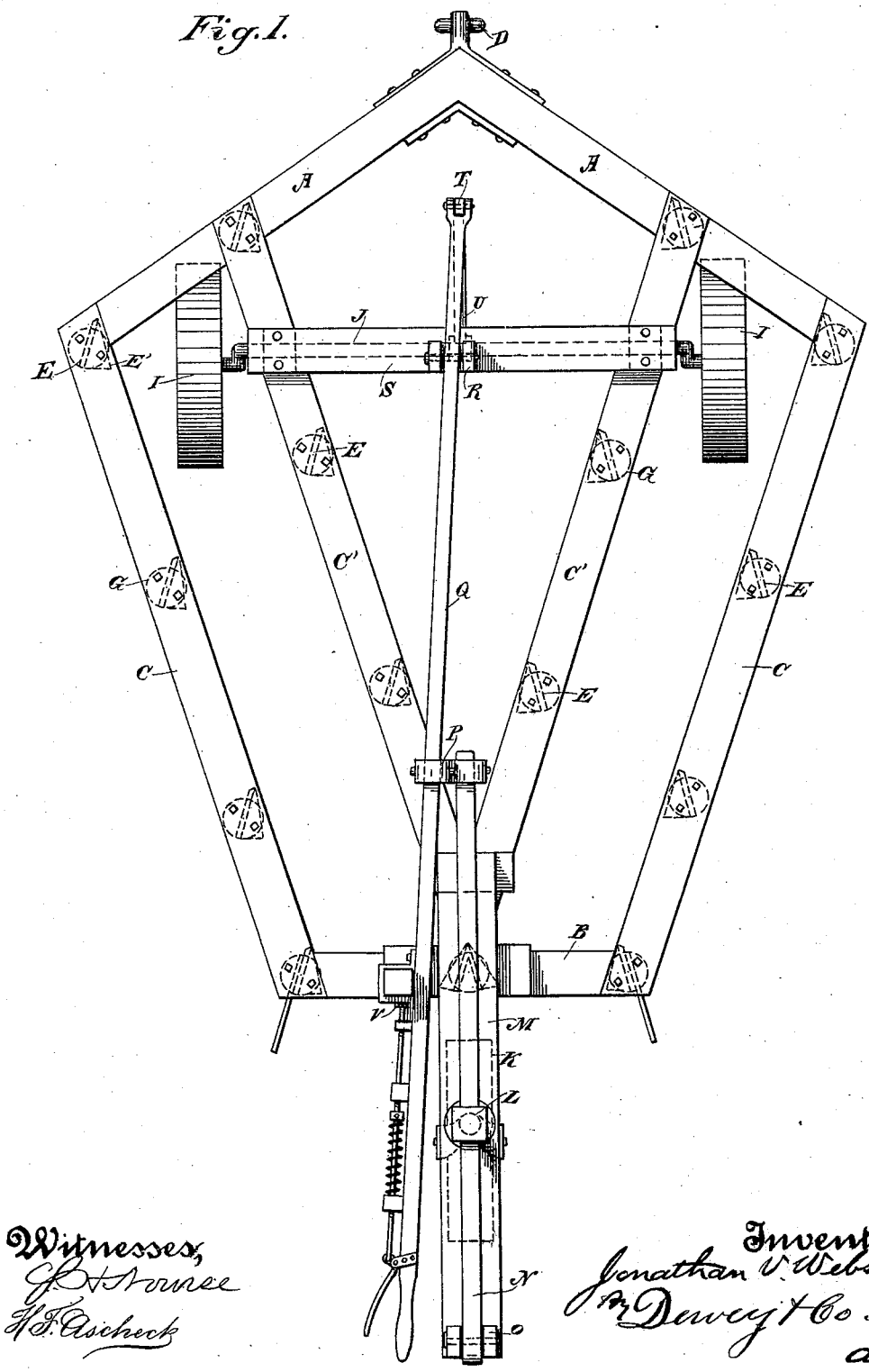

(No Model.) 3 Sheets—Sheet 1.

J. V. WEBSTER.
CULTIVATOR.

No. 455,914. Patented July 14, 1891.

Witnesses,

Inventor,
Jonathan V. Webster
Dewey & Co.
Att'ys

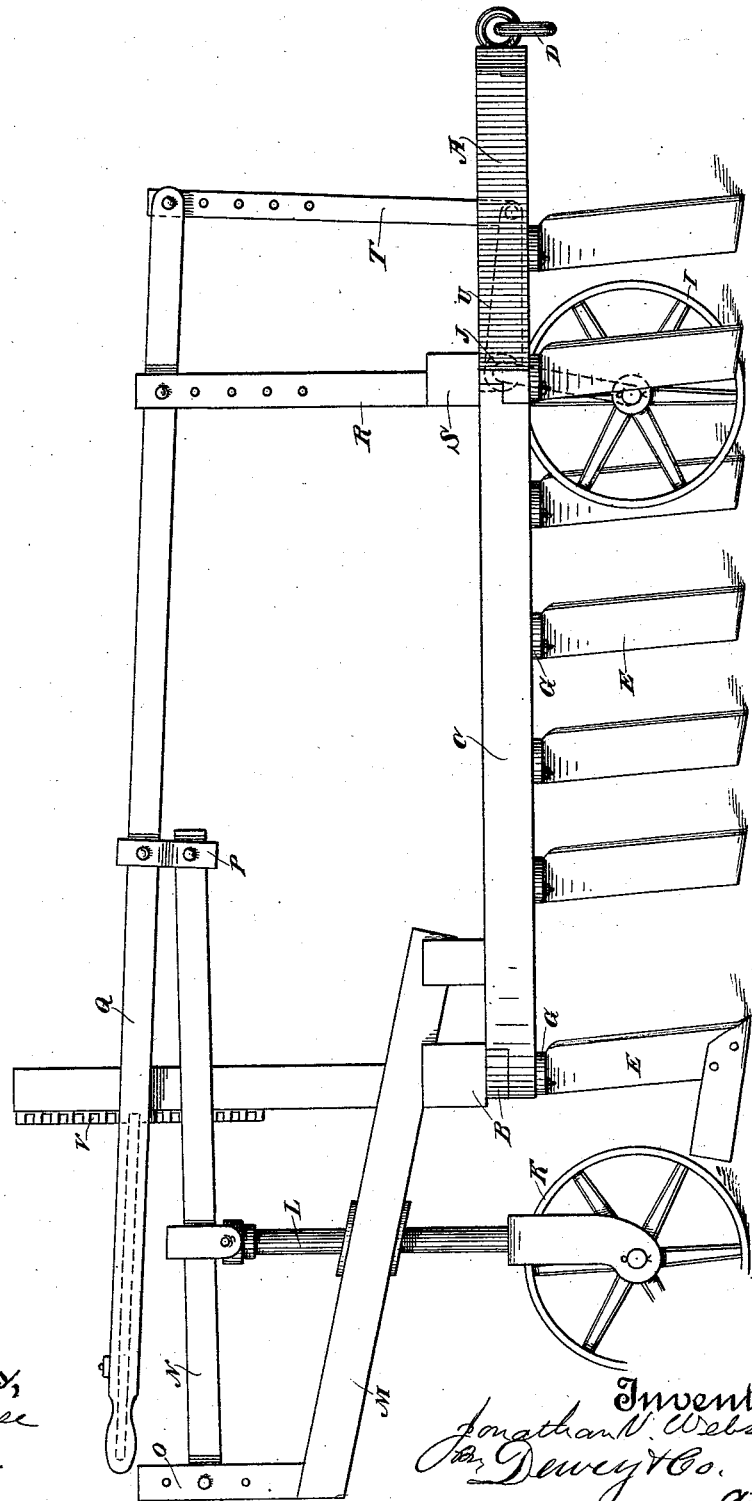

(No Model.) 3 Sheets—Sheet 3.
J. V. WEBSTER.
CULTIVATOR.
No. 455,914. Patented July 14, 1891.
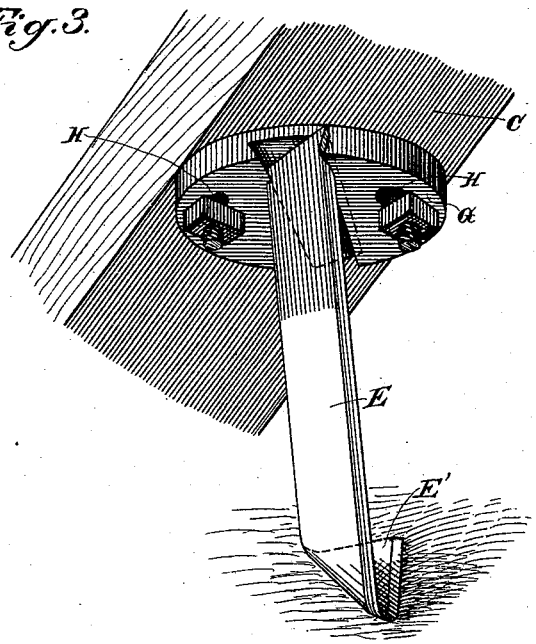
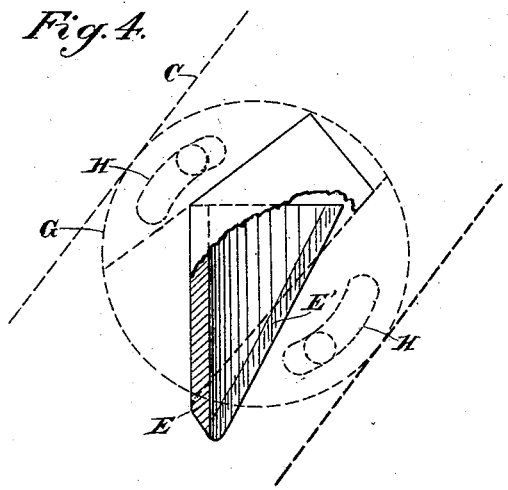
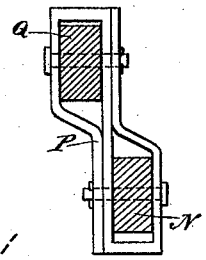
Witnesses:
Inventor,
Jonathan V. Webster
By Dewey & Co.
atty

UNITED STATES PATENT OFFICE.

JONATHAN V. WEBSTER, OF CRESTON, CALIFORNIA.

CULTIVATOR.

SPECIFICATION forming part of Letters Patent No. 455,914, dated July 14, 1891.

Application filed March 13, 1891. Serial No. 384,939. (No model.)

*To all whom it may concern:*

Be it known that I, JONATHAN V. WEBSTER, a citizen of the United States, residing at Creston, San Luis Obispo county, State of California, have invented an Improvement in Cultivators; and I hereby declare the following to be a full, clear, and exact description of the same.

My invention relates to certain improvements in cultivators; and it consists in certain details of construction, which will be more fully explained by reference to the accompanying drawings, in which—

Figure 1 is a plan view of my cultivator. Fig. 2 is a side elevation. Fig. 3 shows the tooth as secured to the frame-timber. Fig. 4 is a top view of the tooth. Fig. 5 is a detail of the link P.

The object of my invention is to so construct the frame and mount the teeth of the cultivator thereon that these teeth will so stand with relation to each other upon the different parts of the frame that when the cultivator has passed over a surface of ground equal to its width the teeth will have stirred and cultivated every portion of the ground so passed over.

A further object is to so construct the teeth of the cultivator that they will present as little obstruction as possible, will cut and loosen up the soil, and may be made adjustable with relation to the line of travel to suit the conditions under which they are to work. I have further shown a combination of levers by which the whole of the frame-work of the cultivator may be raised or depressed simultaneously and without changing its plane of motion.

A A and B are the front and rear timbers, respectively, of my cultivator-frame, and C C are the two outside timbers which connect the two front timbers with the rear one. These frame-timbers are so united as to form a pentagon having the angle or apex formed by the meeting of the two timbers A A at the front, and to this front is attached the doubletree or other draft mechanism D. Within and parallel to the side timbers C C are the timbers C', which extend from the front timbers A to a point where they meet and are united with the rear timber B. Upon the timbers C and C' are fixed the cultivator-teeth, as shown at E.

The arrangement of the timbers C and C', converging from the front toward the rear, is such that the cultivator-teeth E upon the outside timbers stand with relation to the line of travel so that each tooth stirs and cultivates the soil in a line which will just meet and overlap the line of the next adjacent tooth, and the rear tooth upon each of the outer timbers C is in such position with relation to the front tooth of each of the timbers C' that these latter just overlap and continue the track made by the outside teeth, the teeth upon the inner timber C' terminating at one central double tooth, which is arranged to cut upon both sides.

To prevent the cultivator from sliding or being forced to one side or the other, the outer rear teeth upon each side have landsides extending backward to act as guides and to steady the machine. By this arrangement the whole of the soil from one side to the other for the complete width of the cultivator is thoroughly disturbed and agitated by once passing over the ground. In order to effect this object perfectly, I employ a peculiar tooth, which is more fully illustrated in Figs. 3 and 4. This tooth consists of a broad thin blade of steel having the upper end adapted to be secured to the frame-timbers of the cultivator. The front edge of the shank E of this tooth is beveled upon one side, this side being the one which will travel next to the land, and the attachment at the upper end of the shank is such that the shank and tooth may be turned with relation to the line of travel, so as to be thrown a little to one side or the other of this line, so as to lessen the draft or to give a greater or less turning capacity. The bevel upon the front edge of the shank, however, is such that the shank can never be turned so far that this bevel will not travel with proper relation to the land or undisturbed surface toward which it faces. The front edge of the shank is made so sharp that it will cut up soil of the hardest description. At the bottom the shank is turned abruptly into a nearly-horizontal position with reference to a vertical plane; but the rear portion is turned up slightly more than the front portion and is also extended out to a greater distance from the rear of the shank, so that it makes a triangular-shaped tooth having a beveled edge, which is sharpened in the same manner as the front edge of the shank and in continuation of the same. The front of this bent portion or share is made the narrowest and does not extend very much to one side of the bottom of the shank, and this portion widens continually, by reason of its triangular form, from the front to the heel or rear. The shank and tooth are of considerable depth fore and aft, which gives great stiffness and a sufficient amount of material, so that the foot E' can be easily turned upon the bottom of the shank and formed in one piece therewith. By turning the shank of this cutter and adjusting it, as above described, with relation to the line of travel the position of the foot or lower portion will be correspondingly changed and the cut will be varied to correspond.

Various devices may be employed for securing the upper end of the teeth of the timbers, first by splitting the upper end of the shank and turning a flange to either side of the shank, so that they can be bolted against the timbers. In this case either one or both of these flanges may be slotted, so that the bolts pass through them into the timbers, and this will allow the slots to move upon the bolts when the nuts are loosened and by this arrangement the position of the shanks and teeth may be changed. In the other case I employ a flat disk G, having a dovetailed tapering slot made across its lower face, and the upper end of the shank of each tooth is so fitted that it will slip into this beveled slot and lock firmly in place. The disk has curved slots made through it upon each side, as shown at H, and the bolts which secure it to the frame pass through these slots. When the nuts are loosened upon the bolts, the disk may be turned to one side or the other, moving the tooth with it, and when adjusted to suit it is locked by screwing the nuts up again.

The front of the frame-work of my cultivator is supported upon the wheels I, which are journaled upon the crank ends of an axle J. This axle turns in journal-boxes beneath the frame-timbers C', and is as near the front of the frame as the size and proportion of the wheels will admit.

The rear portion of the frame is supported upon a steering or swivel wheel K, the standard L of which extends up through the timber M and is connected with a lever-arm N. The rear of this lever-arm is fulcrumed to an upright O, which stands upon the rear of the timber M. The front end of this lever N is connected by a suitable link P with a lever Q, which is fulcrumed upon the standard R, supported upon a cross-beam S near the front of the frame. The front end of the lever Q is connected by a link T with an arm U. This arm or bar U is rigidly secured to the crank-axle J, upon the ends of which the wheels I are journaled. The rear end of the lever Q is within easy reach of the driver and is held at any desired point by a rack-bar V. The operation of these levers is as follows: When the rear end of the lever Q is pressed downward, it draws by means of the link T upon the end of the bar U, and by means of this bar it turns the shaft J in its journal-boxes, thus raising the frame about the cranks upon which the wheels I are journaled. At the same time the rear end of the lever Q being depressed acts through the link P upon the front end of the lever N, and as this is fulcrumed in the standard O and connected with the standard L of the wheel K the pressure upon the standard L raises the rear end of the frame at the same time that the front end of the frame is raised about the crank-axles, the movement being simultaneous and equal, so that by means of the single lever the whole of the teeth of the cultivator may be correspondingly raised or depressed by reverse action of the lever to vary the cut which they take in the soil.

Having thus described my invention, what I claim as new, and desire to secure by Letters Patent, is—

1. In a cultivator, a frame having the parallel converging timbers with teeth arranged upon said timbers, so that the cuts made by the teeth will overlap each other across the full width of the frame, a crank-axle journaled across the front of the frame having the bearing-wheels upon the crank outer ends, and a swiveled wheel journaled upon a standard at the rear end of the frame, in combination with the levers connected, respectively, with the crank-axle and with the standard of the swivel-wheel, so that the frame is raised or depressed simultaneously at the front and rear, substantially as herein described.

2. The cultivator-frame having the parallel converging timbers with teeth arranged upon said timbers, so that the cuts made by the teeth will overlap each other across the full width of the frame, a crank-axle with wheels upon the outer ends of the cranks, journal-boxes by which said axle is connected with the front of the frame, a swivel-wheel having a standard extending vertically upward through the rear of the frame, a lever fulcrumed at the rear of the frame and connected with the swivel-wheel standard, a second lever fulcrumed upon the front of the frame and connected by a link and turning bar with the front crank-axle, and a link by which the two levers are connected together, so that the single movement will raise or depress the frame simultaneously front and rear, substantially as herein described.

3. In a cultivator, the frame having the teeth connected therewith and provided with shanks, and the disks secured to the frame and receiving the shanks, said disks having segmental slots and bolts, whereby sai may be turned upon the frame so as d teeth their position with relation to the line of travel, substantially as herein described.

4. Cultivator-teeth having the shanks and heads at the upper ends, disks secured to the frame and having segmental slots through which the securing-bolts pass and upon which they may be adjusted, and beveled tapering slots made in the lower faces of said disks adapted to receive the upper ends of the teeth-shanks, substantially as herein described.

5. A cultivator-tooth having the shank, a foot bent at right angles therewith having the heel elevated above the point and of greater width than the front, and an inclined or beveled face upon the front edge of the shank adjacent to the landside forming a sharp edge upon the front of the shank, which forms a continuation with the beveled edge of the triangular foot, substantially as herein described.

In witness whereof I have hereunto set my hand.

JONATHAN V. WEBSTER.

Witnesses:
S. H. NOURSE,
H. F. ASCHECK.